United States Patent
Zhang et al.

(10) Patent No.: US 7,837,429 B2
(45) Date of Patent: Nov. 23, 2010

(54) PREDICTIVE MODEL BASED CONTROL SYSTEM FOR HEAVY DUTY GAS TURBINES

(75) Inventors: Hua Zhang, Greer, SC (US); Dean Erickson, Simpsonville, SC (US); Michael Michalski, Simpsonville, SC (US); Jason Seale, Simpsonville, SC (US); Priscilla Childers, Greenville, SC (US)

(73) Assignee: General Electric Company, Schenectady, NY (US)

( * ) Notice: Subject to any disclaimer, the term of this patent is extended or adjusted under 35 U.S.C. 154(b) by 956 days.

(21) Appl. No.: 11/626,481

(22) Filed: Jan. 24, 2007

(65) Prior Publication Data
US 2010/0034635 A1  Feb. 11, 2010

Related U.S. Application Data

(63) Continuation-in-part of application No. 11/548,791, filed on Oct. 12, 2006.

(51) Int. Cl.
*F01D 25/12* (2006.01)

(52) U.S. Cl. .................. 415/1; 415/17; 415/47; 415/173.1; 415/116; 415/175

(58) Field of Classification Search ............. 415/1, 415/17, 47, 173.1, 116, 175
See application file for complete search history.

(56) References Cited

U.S. PATENT DOCUMENTS

| | | | |
|---|---|---|---|
| 2,650,753 A * | 9/1953 | Howard et al. ............. 415/137 |
| 4,279,123 A | 7/1981 | Griffin et al. | |
| 4,338,061 A * | 7/1982 | Beitler et al. ............... 415/1 |
| 4,573,806 A | 3/1986 | Moore et al. | |
| 4,928,240 A * | 5/1990 | Davison et al. ............. 701/100 |
| 5,012,420 A * | 4/1991 | Walker et al. ............... 701/100 |
| 5,116,199 A | 5/1992 | Ciokajlo | |
| 5,160,241 A | 11/1992 | Glynn | |
| 5,205,115 A | 4/1993 | Plemmons et al. | |
| 5,281,085 A * | 1/1994 | Lenahan et al. ............. 415/116 |
| 5,399,066 A | 3/1995 | Ritchie et al. | |
| 5,540,547 A | 7/1996 | Cole | |
| RE35,674 E | 12/1997 | Pustell | |
| 6,431,824 B2 | 8/2002 | Schotsch et al. | |
| 6,454,529 B1 | 9/2002 | Zearbaugh et al. | |
| 6,487,491 B1 * | 11/2002 | Karpman et al. ............ 701/100 |
| 6,615,588 B2 | 9/2003 | Hoecker | |
| 6,997,673 B2 | 2/2006 | Morris et al. | |

(Continued)

OTHER PUBLICATIONS

Non-Final Office Action for U.S. Appl. No. 11/548,791 mailed on Feb. 23, 2009.

(Continued)

*Primary Examiner*—Ninh H Nguyen
(74) *Attorney, Agent, or Firm*—Sutherland Asbill & Brennan LLP (57) ABSTRACT

A system for controlling the clearance between a turbine blade and the turbine casing that includes an impingement cooling manifold attached to a turbine casing, a temperature sensing device for determining the temperature of the turbine casing, a blower, a control system logic for determining the setting temperature of the casing, and a controller for controlling the blower, wherein the blower forces air onto the impingement cooling manifold to cool the casing towards the setting temperature and control the clearance.

20 Claims, 7 Drawing Sheets

U.S. PATENT DOCUMENTS

2008/0089780 A1  4/2008  Erickson et al.
2008/0193278 A1  8/2008  Erickson et al.
2009/0068007 A1  3/2009  Erickson et al.

OTHER PUBLICATIONS

Final Office Action for U.S. Appl. No. 11/548,791 mailed on Jun. 1, 2009.

Advisory Action for U.S. Appl. No. 11/548,791 mailed on Jul. 23, 2009.

Non-Final Office Action for U.S. Appl. No. 11/548,791 mailed on Oct. 19, 2009.

Final Office Action for U.S. Appl. No. 11/548,791 mailed on Apr. 2, 2010.

* cited by examiner

PREDICTIVE MODEL BASED CONTROL SYSTEM FOR HEAVY DUTY GAS TURBINES

CROSS-REFERENCE TO RELATED APPLICATIONS

This is a continuation-in-part of U.S. application Ser. No. 11/548,791, filed Oct. 12, 2006, entitled "Turbine Case Impingement Cooling for Heavy Duty Gas Turbines" now pending. That application is incorporated herein by reference.

BACKGROUND OF THE INVENTION

Air impingement cooling has been used to manage the casing temperature of small gas turbines and to reduce and maintain the clearances between rotating blades and accompanying interior casing surfaces. One problem for air impingement cooling systems on heavy-duty gas turbines is the ability to achieve a uniform heat transfer coefficient across large non-uniform non-standard casing surfaces. On small gas turbines, small impingement holes and short nozzle to surface distances are normally applied. These factors produce the required higher heat transfer coefficients on the casing. One detrimental impact of small impingement cooling holes is the need for operating with high differential pressure drop across the holes. This results in the requirement for undesirable high cooling air supply pressures which negatively impacts net efficiency for heavy duty gas turbines.

Impingement cooling has been applied to aircraft engines as a method of turbine clearance control. However, the impingement systems used on aircraft engines cannot be used in heavy-duty turbine applications. The systems applied to aircraft engines utilize air extracted from the compressor as the cooling medium. It is not feasible to use compressor extraction air on heavy-duty gas turbines because the design heat transfer coefficients require cooler air temperatures. Heavy-duty gas turbines have a significantly larger, non-uniform casing surface that requires an intricate manifold design as compared to aircraft engines. Also, the casing thickness and casing thickness variations are considerably greater on heavy-duty gas turbines.

The clearances between rotating blades and accompanying interior casing surfaces cannot be easily measured using instrumentation in permanent installations. Yet the desired clearance should be the controlled by allowing higher or lower impingement cooling.

Accordingly, there is a need in the art for an impingement cooling control system that can provide clearance control on heavy-duty gas turbines.

BRIEF DESCRIPTION OF THE INVENTION

In one embodiment, the invention provides a method for controlling a clearance between a turbine blade and a turbine casing which may include determining the temperature of the casing; determining the setting temperature of the casing based on a transfer function, wherein the setting temperature is the desired temperature of the casing to control the clearance; and modifying the temperature of the casing based on the setting temperature using a controller.

In yet another embodiment, the invention provides a system for controlling the clearance between a turbine blade and the turbine casing. The system may include an impingement cooling manifold attached to a turbine casing; a temperature sensing device for determining the temperature of the turbine casing; a blower; a control system logic for determining the setting temperature of the casing; and a controller for controlling the blower, wherein the blower forces air onto the impingement cooling manifold to cool the casing towards the setting temperature and control the clearance.

In yet another embodiment, the invention provides a system for controlling the clearance between a turbine blade and the turbine casing. The system may include an impingement cooling manifold attached to a turbine casing; a temperature sensing device for determining the temperature of the turbine casing; a blower; a control system logic for determining the setting temperature of the casing; and a controller for controlling the blower, wherein the blower forces air onto the impingement cooling manifold to cool the casing towards the setting temperature and control the clearance.

DETAILED DESCRIPTION OF THE INVENTION

The present invention now will be described more fully hereinafter with reference to the accompanying drawings, in which exemplary embodiments of the invention are shown. This invention may, however, be embodied in many different forms and should not be construed as being limited to the embodiments set forth herein; rather, these embodiments are provided so that this disclosure will be thorough and complete, and will convey the scope of the invention to those skilled in the art.

Figure 1:
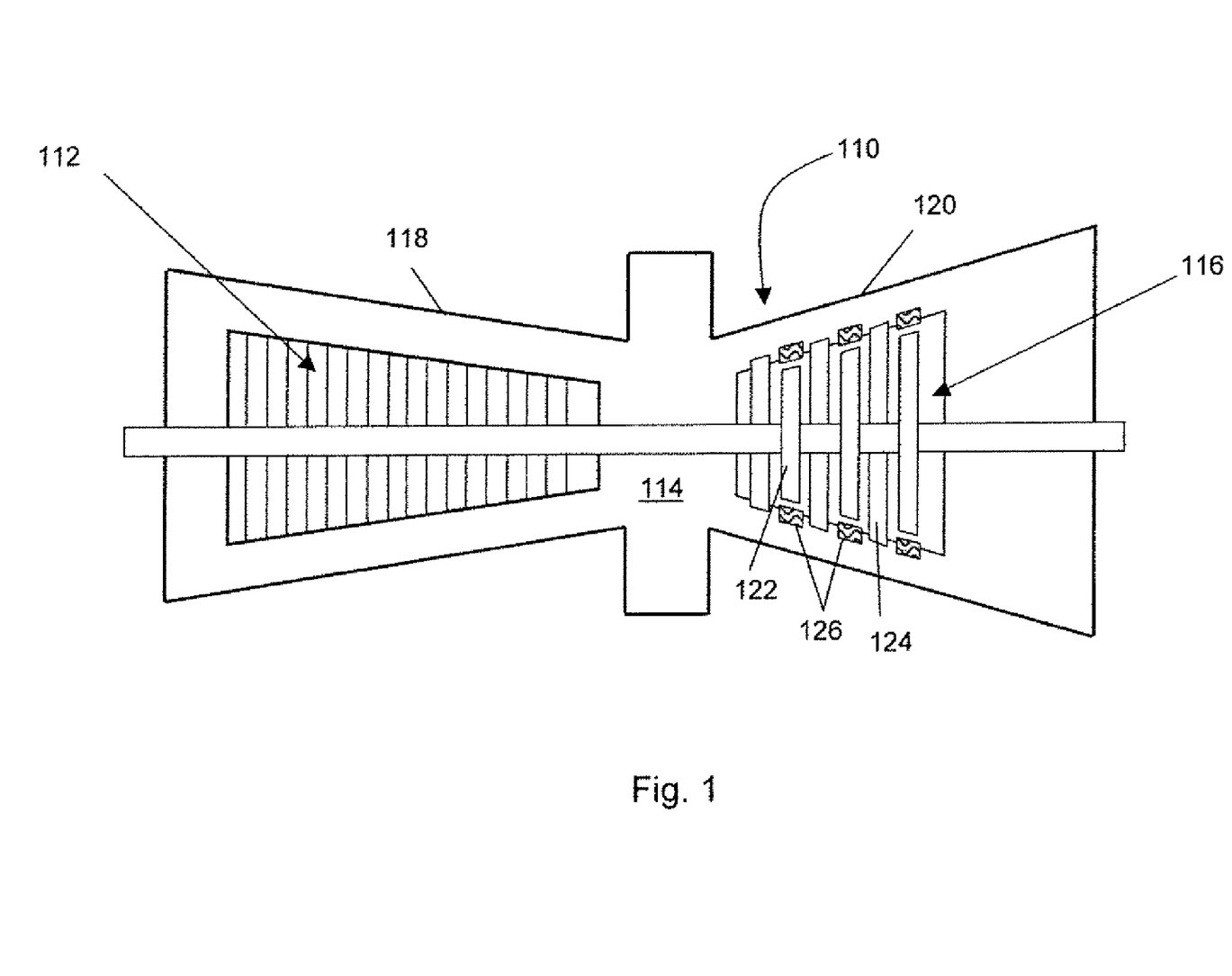
FIG. 1 is a cross-sectional view of a heavy duty gas turbine according to an embodiment of the invention.
Figure 2:
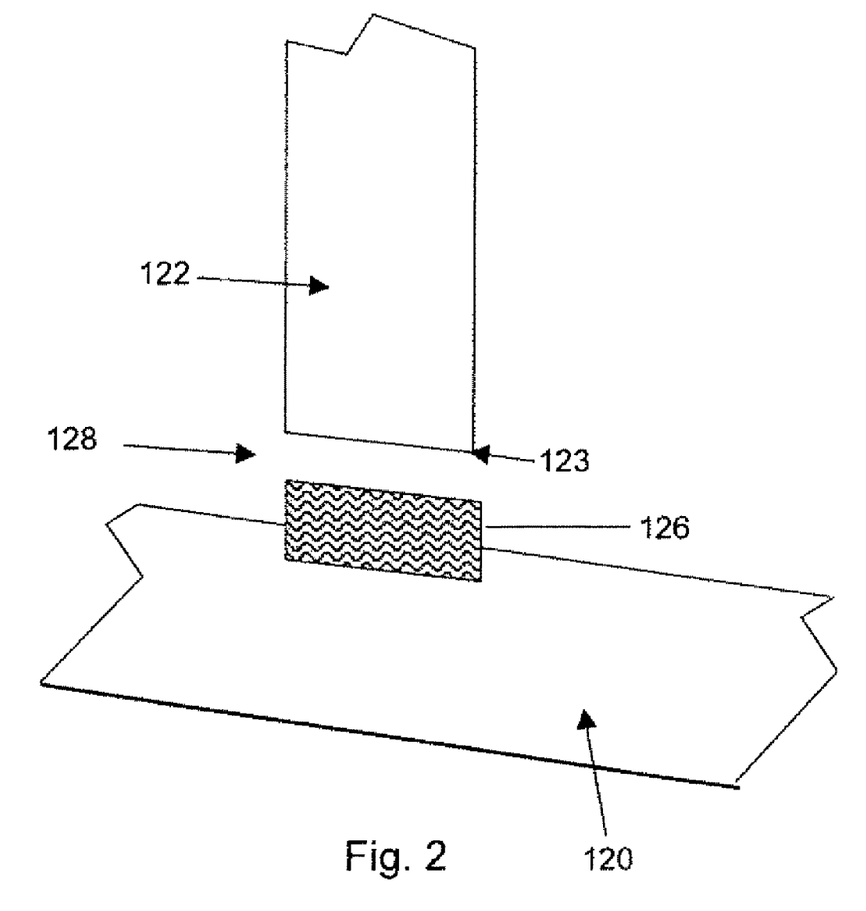
FIG. 2 is a close-up view of the turbine blade to shroud clearance according to an embodiment of the invention.

FIG. 1 illustrates an exemplary embodiment of a heavy-duty turbine 110. The heavy-duty turbine engine includes a compressor section 112, combustor section 114, and a turbine section 116. The turbine 110 also includes a compressor casing 118 and a turbine casing 120. The turbine and compressor casings 118, 120 enclose major parts of the heavy-duty turbine. The turbine section 116 includes a shaft and a plurality of sets of rotating and stationary turbine blades.

Figure 3:
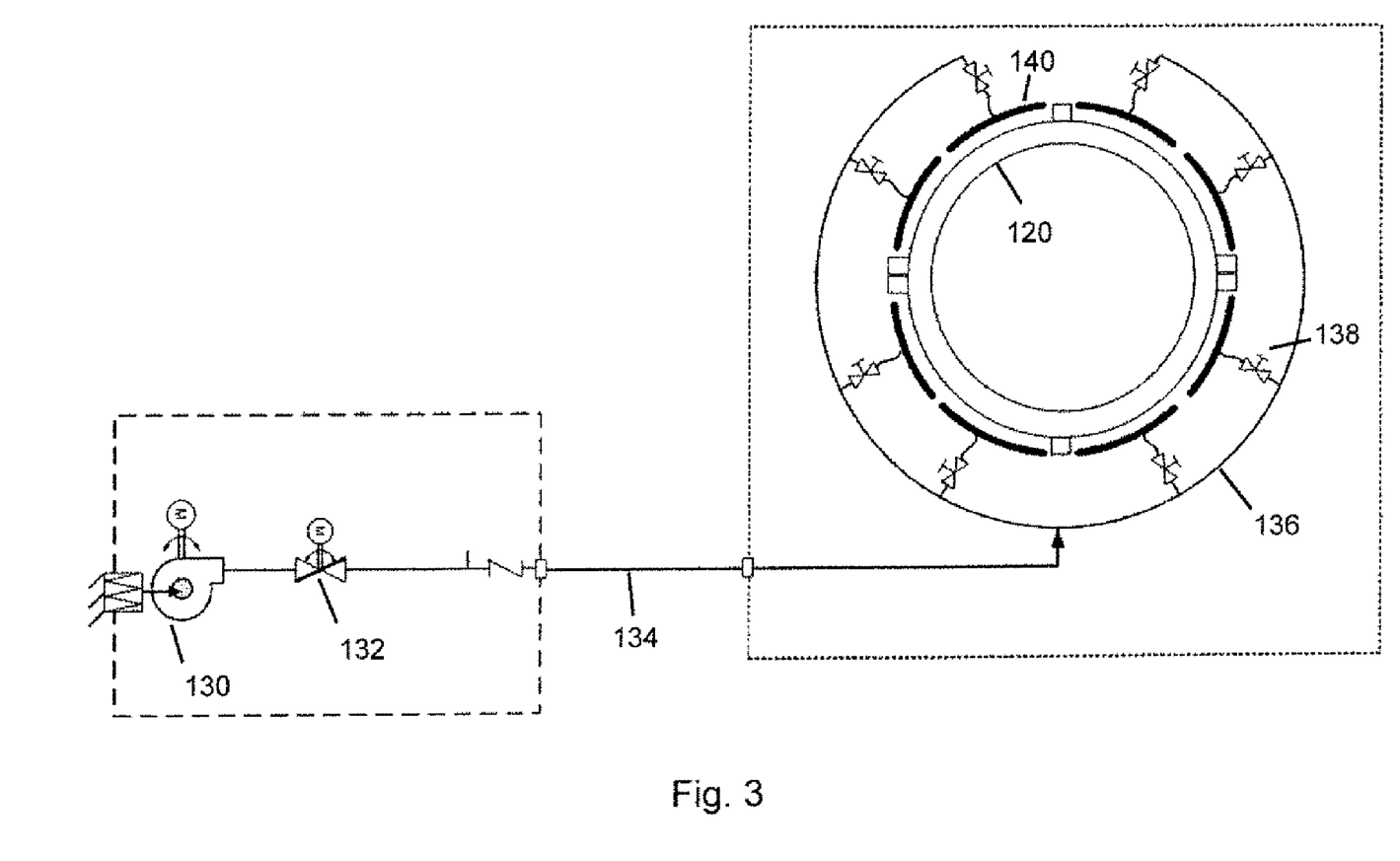
FIG. 3 is an impingement cooling system according to an embodiment of the invention.

Referring to FIGS. 1 and 3, the turbine casing 120 may include a shroud 126 affixed to the interior surface of the casing 120. The shroud 126 may be positioned proximate to the tips of the rotating turbine blades 122 to minimize air leakage past the blade tip. The distance between the blade tip 123 and the shroud 126 is referred to as the clearance 128. It is noted that the clearances 128 of each turbine stage are not consistent due to the different thermal growth characteristics of the blades and casing.

A key contributor in the efficiency of heavy-duty gas turbines is the amount of air/exhaust gas leakage through the blade tip to casing clearance 128. Due to the different thermal growth characteristics of the turbine blades 123 and turbine casing 120, clearances 128 significantly change as the turbine transitions through transients from ignition to a base-load steady state condition. A clearance control system, including its operating sequence, may be implemented to address the specific clearance characteristics during all operating conditions. Incorrect design and/or sequencing of the control system may lead to excessive rubbing of the turbine blade 123 tips with the casing shrouds 126, which can result in increased clearances and reduced performance.

As illustrated in the exemplary embodiment of FIG. 3, an impingement air-cooling system 200 may be used to reduce and maintain the clearances between the turbine shroud 126 and the accompanying blade tip 123. Referring to FIG. 3, the impingement air-cooling system 200 may consist of a blower 130, a flow control damper 132, interconnect piping 134, a distribution header 136, flow metering valves or orifices 138 and a series impingement cooling manifolds 140. The impingement cooling manifold is affixed to the turbine casing. In the exemplary embodiment of FIG. 3, a plurality of impingement manifolds 140 are affixed about the circumference of the turbine casing 120. The impingement cooling blower 130 takes suction from ambient air and blows the air through the flow control damper 132, interconnect piping 134, distribution header 136, flow metering valves or orifices 138 and into the impingement cooling manifolds 140. The blower 130 may be any blowing device including a fan or a jet. The impingement cooling manifold 140 insures a uniform heat transfer coefficient is delivered to the turbine casing 120. It should be appreciated that the impingement air-cooling system is not limited to the components disclosed herein but may include any component that enables air to pass along the impingement cooling manifolds.

Figure 4:
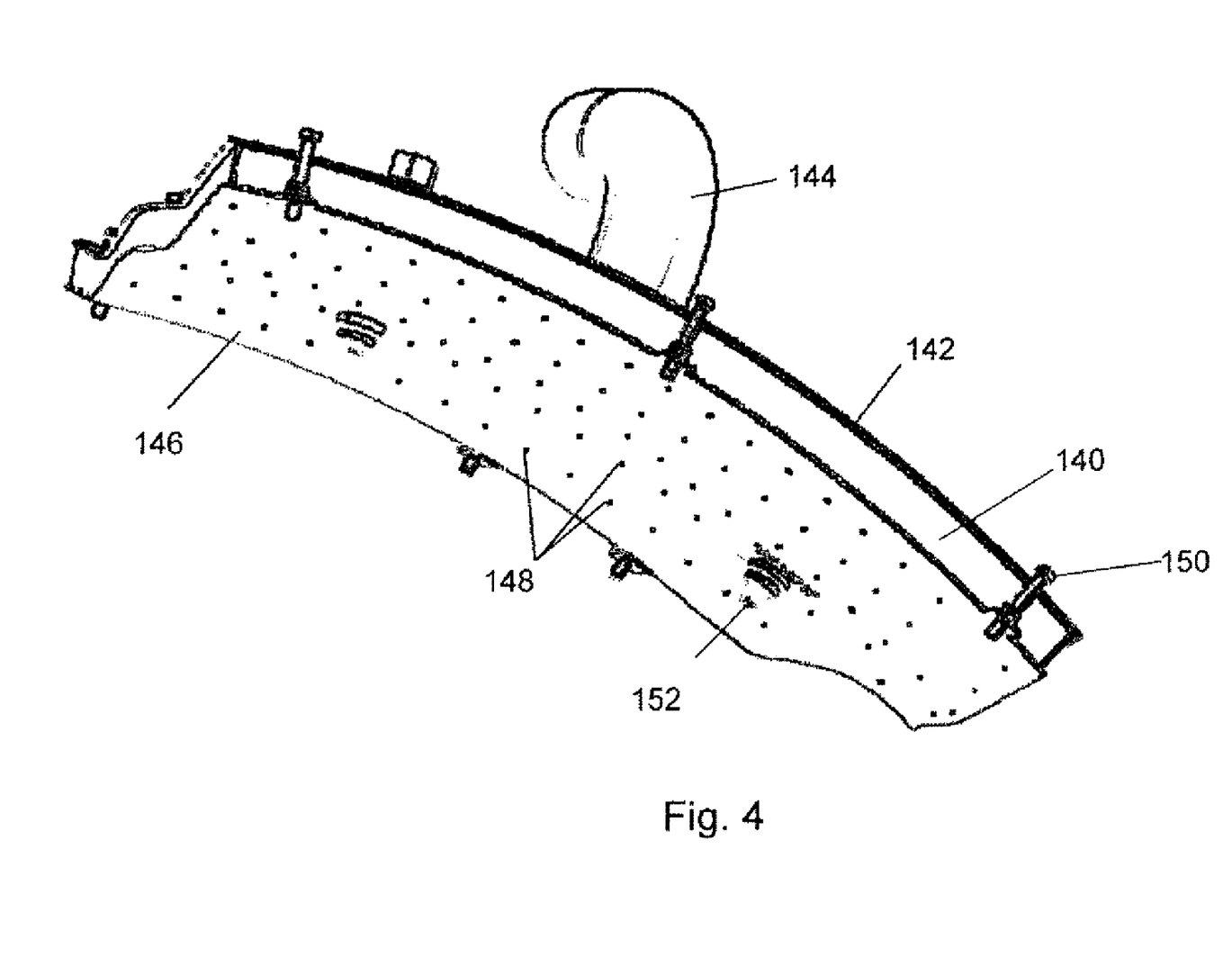
FIG. 4 is a perspective view of a impingement cooling manifold according to an embodiment of the invention.
Figure 5:
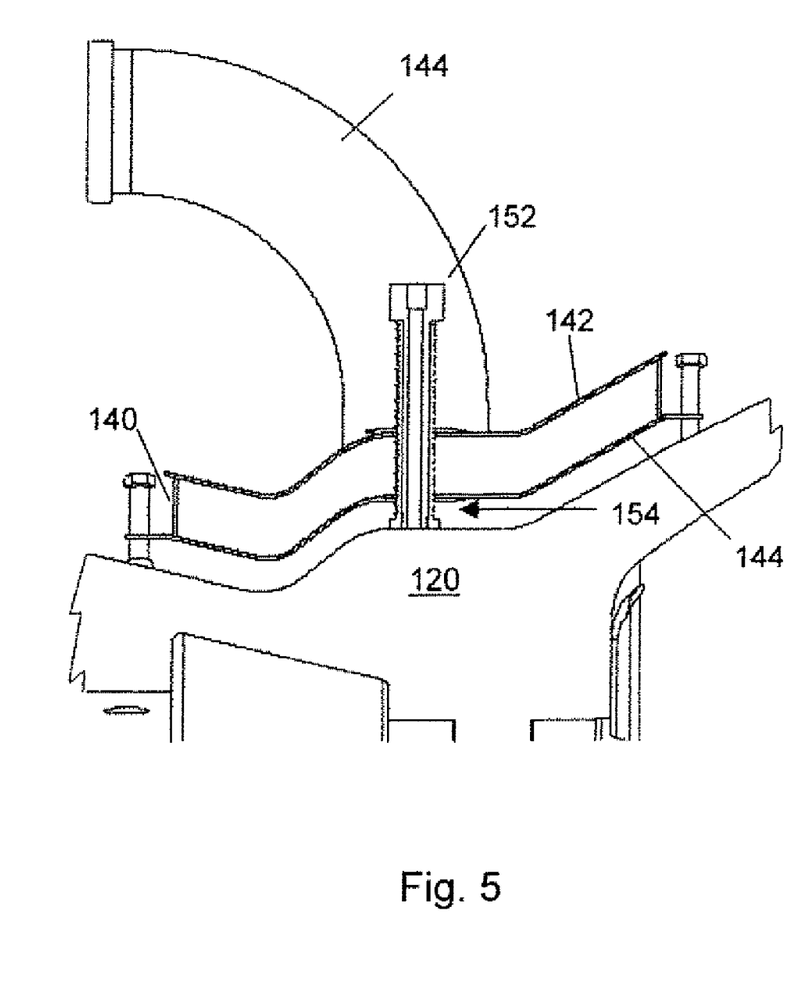
FIG. 5 is a cross-section view of an impingement cooling manifold according to an embodiment of the invention.

Referring to the exemplary embodiment illustrated in FIGS. 4 and 5, the impingement cooling manifolds 140 may be designed to the contours of the target area of the turbine casing 120. Each impingement cooling manifold 140 may include an upper plate 142 with feed pipe 144, a lower plate 146 with multiple impingement holes 148, side pieces, support legs 150 and hold-down supports 152. The impingement holes 148 permit the air to flow from the impingement cooling manifold to the turbine casing to selectively cool the turbine casing.

The impingement holes 148 may be positioned in an array. In an exemplary embodiment, the impingement holes 148 may be spaced in the range from 1.25 to 2.5 inches. In an exemplary embodiment, the individual impingement holes 148 may be sized between 0.12 and 0.2 inches. The varying hole sizes and spacing are required to compensate for the non-uniformity of the turbine casing geometry. The size and positioning of the impingement holes 148 on the lower plate 146 produce a uniform heat transfer coefficient across the casing targeted by the impingement air-cooling system. However, the impingement holes are not limited to these sizes or spacings. The distance between the upper 142 and lower plates 146 also may be dimensioned to minimize internal pressure variations, which results in uniform cooling hole pressure ratios.

The gap distance between impingement cooling manifold lower plates 146 and the turbine casing 120 effects the heat transfer coefficient. Too large of a gap can result in a non-optimum heat transfer coefficient. Too little of a gap can result in both non-optimum and a non-uniform heat transfer coefficient. In an exemplary embodiment, a gap of between 0.5 and 1.0 inch provides a suitable heat transfer coefficient. However, the gap in not limited to this range and may be any distance that provides a suitable heat transfer coefficient.

Figure 6:
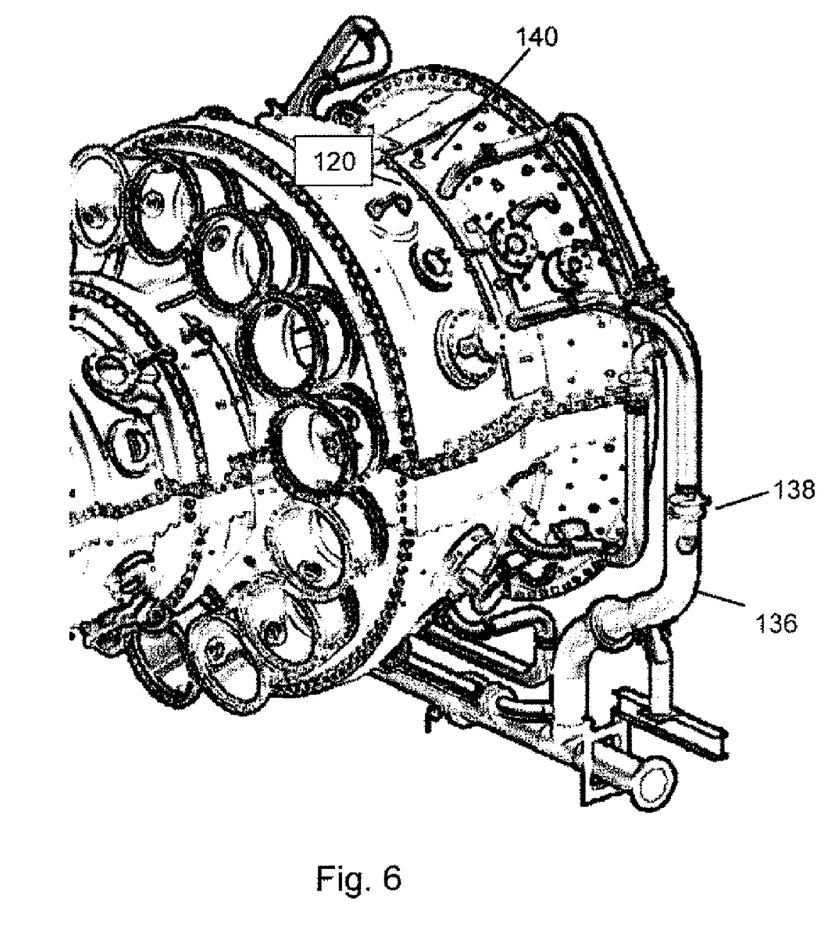
FIG. 6 is a perspective view of installed impingement cooling manifolds on a turbine casing according to an embodiment of the invention.

As illustrated in FIG. 6, an exemplary embodiment may include a plurality of impingement cooling manifolds 140. The plurality of impingement cooling manifolds 140 may be affixed to the casing 120 of the turbine directly above the target cooling area. The impingement cooling manifolds 140 may be positioned such that there is ample spacing between their edges and any protrusions off of the casing. This provides a free path for the air passing through the impingement holes 148 to exhaust from under the impingement cooling manifold 140 to the environment. In an exemplary embodiment, the spacing between two adjacent impingement cooling manifolds may be between 1 to 30 inches and is dependent on casing protrusions and flanged joints. The spacing are not limited to these dimensions and may be spaced at any suitable distance. The impingement cooling manifolds 140 also may provide impingement cooling to any of the axial flanges, including a horizontal split joint.

Control of the Clearance

Figure 7:
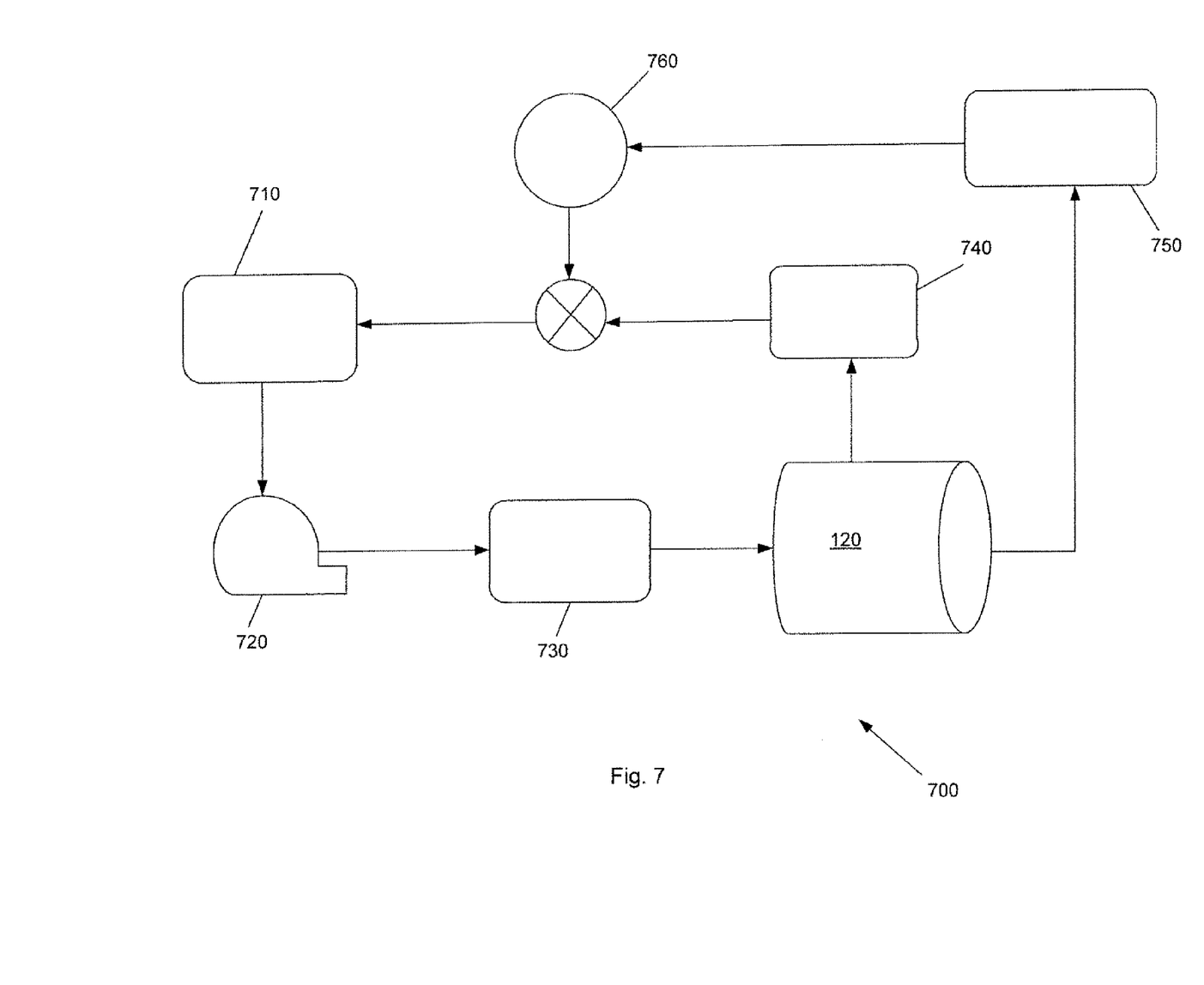
FIG. 7 is a control system according to an embodiment of the invention.

A control system 700 may be implemented to control the clearance. The clearance can be directly measured during operation using a wide range of sensors inside the casing of the turbine, including but not limited to microwave and capacitance clearance sensors. However, the mortality rate for these sensors is extremely high. To avoid the placement of a sensor in the casing, the temperature of the casing may be used to control the clearance. At a given casing temperature, the clearance can be approximated. Therefore, the control system 700 may be based in part on the temperature of the casing. FIG. 7 illustrates an embodiment of the control system.

An exemplary embodiment of the control system logic of the control system 700 is described below with reference to block diagrams of systems, methods, apparatuses and computer program products according to an embodiment of the invention. It will be understood that each block of the block diagrams, and combinations of blocks in the block diagrams, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functionality of each block of the block diagrams, or combinations of blocks in the block diagrams discussed in detail in the descriptions below.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

The control system 700 may be implemented through an application program running on an operating system of a computer. The control system 700 also may be practiced with other computer system configurations, including hand-held devices, multiprocessor systems, microprocessor based or programmable consumer electronics, mini-computers, mainframe computers, etc.

Application programs that are components of the control system 700 may include routines, programs, components, data structures, etc. that implement certain abstract data types, perform certain tasks, actions, or tasks. In a distributed computing environment, the application program (in whole or in part) may be located in local memory, or in other storage. In addition, or in the alternative, the application program (in whole or in part) may be located in remote memory or in storage to allow for the practice of the inventions where tasks are performed by remote processing devices linked through a communications network. Exemplary embodiments of the invention are more fully described hereinafter with reference to the accompanying drawings, in which like numerals indicate like elements throughout the several drawings. Indeed, these inventions may be embodied in many different forms and should not be construed as limited to the embodiments set forth herein; rather, these embodiments are provided so that this disclosure will satisfy applicable legal requirements.

As shown in the exemplary embodiment of FIG. 7, the control system 700 to adjust the clearance 128 in the turbine may be based on the temperature of the casing 120. The control system 700 may employ a controller 710 for modifying operating conditions of the turbine to change the temperature of the casing 120 by controlling the level of cooling to the heavy duty turbine.

Operating conditions that may be modified to change the temperature of the casing 120 may include flow rate of the air and coolant temperature. For purposes of illustration, in the exemplary embodiment of FIG. 7, the controller 710 modifies the flow rate of the air to change the temperature of the casing at block 720.

As shown previously in FIG. 3, the ambient air may be forced onto the turbine easing using the blower 130 or any other air movement device to cool the casing 120. In an exemplary embodiment, the air may be forced into the impingement cooling manifold 140 attached to the casing to cool the casing 120. The air also may be forced into a plurality of impingement cooling manifolds 140 positioned about the circumference of the casing 120.

The temperature of the ambient air forced onto the casing 120 may be measured at block 730. The turbine casing 120 temperature is measured at block 740. The temperatures of the ambient air and the casing may be measured with any temperature measuring device known to those of ordinary skill in the art.

At block 750, a transfer function may be implemented to determine a setting temperature 760 based on the current operating conditions. The setting temperature 760 may be the temperature of the casing and is set according to the desired clearance 128. The clearance measurement may be a function of the current operating conditions, which may include gas turbine load, time, ambient temperature, rotor temperature, casing temperature. The transfer function may be created from the operating conditions and a clearance model that models the expansion of the casing due to the current operating conditions. In an exemplary embodiment, the setting temperature may be a function of ambient temperature, rotor temperature, and gas turbine load conditions.

If the clearance model determines that the clearance 128 is below a minimum allowable value, the system may shutdown or halt operation of the turbine. Otherwise, the output of the transfer function 750 is a setting temperature 760.

The setting temperature and the casing temperature may be input to the controller 710. The controller 710 outputs a control signal to the blower 130 to modify the flowrate of the ambient air being blown over the casing 118 at block 720. In an exemplary embodiment, the controller 710 is a proportional, integral, derivative ("PID") controller. One of ordinary skill in the art will appreciate that a proportional controller, integral controller, or derivative controller may be used alone or in combination to control the operating conditions of the turbine.

For the exemplary embodiment including a number of impingement cooling manifolds 140, the control system may control the air flow into one or more of the impingement cooling manifolds 140. It is also contemplated that a control system 700 may be implemented for each impingement cooling manifold 140 separately to control the local clearance of the casing 120. It is further contemplated that a plurality of blowers 130 may be used to force air onto the plurality of impingement cooling manifolds 140.

One of ordinary skill in the art will appreciate, the invention is not limited to the configuration of the control system 700 illustrated herein. One of ordinary skill in the art will appreciate that many variations of the control system may be implemented such that the temperature of the casing is ultimately controlled. For example, the control system can be an open loop system based upon the gas turbine load conditions or any other permissible model.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in generic and descriptive sense only and not for purposes of limitation.

The invention claimed is:

1. A method for controlling a clearance between a turbine blade and a turbine casing, comprising:
   determining the temperature of the casing;
   determining the setting temperature of the casing based on a transfer function, wherein the transfer function is based on inputs chosen from the group consisting of load, time, ambient temperature, and casing temperature, wherein the setting temperature is the desired temperature of the casing to control the clearance; and
   modifying the temperature of the casing based on the setting temperature using a controller.

2. The method of claim 1 wherein the temperature of the casing is modified by a blower forcing air onto the casing.

3. The method of claim 1 further comprising:
   providing an impingement cooling manifold to the casing; and
   providing a blower to force air onto the impingement cooling manifold to modify the temperature of the casing.

4. The method of claim 3 wherein the controller controls the amount of air blown from the blower to modify the temperature of the casing towards the setting temperature.

5. The method of claim 3 wherein the controller controls the amount of air blown from the blower into a plurality of impingement cooling manifolds.

6. The method of claim 1 wherein the controller is a PID controller.

7. A system for controlling the temperature of a turbine casing, comprising:
   a temperature sensing device for determining the temperature of the turbine casing;
   a blower;
   a control system logic for determining a setting temperature of the casing; and
   a controller for controlling the blower, wherein the blower forces air onto the casing to cool the casing towards the setting temperature.

8. A system for controlling the clearance between a turbine blade and a turbine casing comprising:
- an impingement cooling manifold attached to the turbine casing;
- a temperature sensing device for determining the temperature of the turbine casing;
- a blower;
- a control system logic for determining a setting temperature of the casing; and
- a controller for controlling the blower, wherein the blower forces air onto the impingement cooling manifold to cool the casing towards the setting temperature and control the clearance.

9. The system of claim 8 further comprising a plurality of impingement cooling manifolds to cool the casing and control the clearance.

10. The system of claim 9 further comprising a plurality of blowers to force air into the plurality of impingement cooling manifolds.

11. The system of claim 8 wherein the setting temperature is determined from a transfer function based on inputs chosen from the group consisting of load, time, ambient temperature, and casing temperature.

12. The system of claim 8 wherein the blower forces ambient air onto the casing.

13. The system of claim 8 wherein the control system logic determines the setting temperature by implementing a transfer function, the setting temperature being a temperature of the casing selected to achieve a desired turbine clearance, the transfer function based on a clearance model that models the expansion of the turbine casing under current turbine operating conditions, the current operating conditions comprising at least two conditions selected from the group consisting of: turbine load, time, ambient temperature, rotor temperature, and casing temperature.

14. The system of claim 13 wherein the control system logic is operable to shut-down the turbine in response to the clearance model predicting a turbine clearance based on the current operating conditions that is below a minimum allowable value.

15. The system of claim 8 wherein the controller modifies an air flow rate of ambient air from the blower based at least in part on the turbine casing temperature determined by the temperature sensing device and the setting temperature determined by the control system logic.

16. The system of claim 8 wherein:
- the control system logic determines the setting temperature by implementing a transfer function, the setting temperature being a temperature of the casing selected to achieve a desired turbine clearance in response to current turbine operating conditions, the transfer function based on a clearance model that models the expansion of the turbine casing under the current turbine operating conditions;
- the controller receives the setting temperature from the control system logic and the casing temperature from the temperature sensing device, and the controller outputs a control signal to the blower to modify an air flow rate; and
- the blower forces ambient air onto the casing in accordance with the air flow rate determined by the controller.

17. The system of claim 8 wherein:
- the control system logic determines the setting temperature by implementing a transfer function, the setting temperature being a temperature of the casing selected to achieve a desired turbine clearance in response to current turbine operating conditions, the transfer function based on a clearance model that models the expansion of the turbine casing under the current turbine operating conditions, the current operating conditions comprising at least two conditions selected from the group consisting of: turbine load, time, ambient temperature, rotor temperature, and casing temperature;
- the controller receives the setting temperature from the control system logic and the casing temperature from the temperature sensing device, and the controller outputs a control signal to the blower to modify an air flow rate; and
- the blower forces ambient air onto the casing in accordance with the air flow rate determined by the controller.

18. The system of claim 8 wherein:
- the impingement cooling manifold comprises a plurality of impingement cooling manifolds;
- the control system logic determines the setting temperature by implementing a transfer function, the setting temperature being a temperature of the casing selected to achieve a desired turbine clearance in response to current turbine operating conditions, the transfer function based on a clearance model that models the expansion of the turbine casing under the current turbine operating conditions;
- the controller receives the setting temperature from the control system logic and receives the casing temperature from the temperature sensing device, and the controller outputs a control signal to the blower to modify an air flow rate; and
- the blower forces ambient air through the plurality of impingement cooling manifolds onto the casing in accordance with the air flow rate determined by the controller.

19. The system of claim 18 wherein the control system logic is operable to shut-down the turbine in response to the clearance model predicting a turbine clearance based on the current operating conditions that is below a minimum allowable value.

20. The system of claim 19 wherein the controller is a PID controller.

* * * * *